US011351884B2

(12) United States Patent
Rhodes

(10) Patent No.: US 11,351,884 B2
(45) Date of Patent: Jun. 7, 2022

(54) POWER TO THE BOX SYSTEMS AND METHODS

(71) Applicant: Ford Global Technologies, LLC, Dearborn, MI (US)

(72) Inventor: Kevin James Rhodes, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 433 days.

(21) Appl. No.: 16/570,994

(22) Filed: Sep. 13, 2019

(65) Prior Publication Data

US 2021/0078432 A1    Mar. 18, 2021

(51) Int. Cl.
| | |
|---|---|
| *B60L 53/66* | (2019.01) |
| *G06Q 30/04* | (2012.01) |
| *B60L 53/62* | (2019.01) |
| *H04Q 9/00* | (2006.01) |
| *G06Q 50/06* | (2012.01) |

(52) U.S. Cl.
CPC .............. *B60L 53/665* (2019.02); *B60L 53/62* (2019.02); *G06Q 30/04* (2013.01); *G06Q 50/06* (2013.01); *H04Q 9/00* (2013.01); *H04Q 2209/84* (2013.01)

(58) Field of Classification Search
CPC ...... B60L 53/655; B60L 53/665; B60L 53/62; G06Q 50/06; G06Q 30/04; H04Q 2209/84
See application file for complete search history.

(56) References Cited

U.S. PATENT DOCUMENTS

| | | | |
|---|---|---|---|
| 7,928,596 B2 | 4/2011 | Kumar et al. | |
| 8,019,483 B2 | 9/2011 | Keefe | |
| 8,452,661 B2 | 5/2013 | Karch et al. | |
| 8,912,753 B2 | 12/2014 | Pudar et al. | |
| 8,918,376 B2 | 12/2014 | Ambrosio et al. | |
| 9,187,085 B1 | 11/2015 | Nallapa et al. | |
| 2008/0243657 A1* | 10/2008 | Voysey | G06Q 50/16 705/34 |
| 2009/0150100 A1* | 6/2009 | Pifer | H02J 9/06 702/62 |
| 2010/0003950 A1* | 1/2010 | Ray | H04M 3/5116 455/404.1 |

(Continued)

OTHER PUBLICATIONS

Massey, "Howto Sell Power from Electric Cars Back to the Grid", Apr. 2013, https://www.scientificamerican.com/article/how-to-sell-power-from-electric-cars-back-to-the-grid/ (Year: 2013).*

(Continued)

*Primary Examiner* — Allen C Chein
(74) *Attorney, Agent, or Firm* — Frank Lollo; Eversheds Sutherland (US) LLP

(57) ABSTRACT

Power to the box systems and methods are provided herein. An example system includes a human machine interface of a vehicle, a power to the box system of the vehicle, and a controller having a processor and a memory, the processor executing instructions stored in the memory to determine actuation of a power to the box system of a vehicle, determine usage parameters of the power to the box system of the vehicle during a period of use extending from the actuation to a terminating event, generate a message that includes information indicative of the usage parameters; and transmit the message to a receiving party.

13 Claims, 4 Drawing Sheets

(56) References Cited

U.S. PATENT DOCUMENTS

| | | | |
|---|---|---|---|
| 2011/0221393 A1* | 9/2011 | Billmaier | B60L 53/65 |
| | | | 320/109 |
| 2013/0311017 A1* | 11/2013 | Matsunaga | B60L 58/14 |
| | | | 701/22 |
| 2014/0074556 A1* | 3/2014 | Garner | G06Q 50/06 |
| | | | 705/7.35 |
| 2020/0339004 A1* | 10/2020 | Oshima | G06Q 50/06 |

OTHER PUBLICATIONS

Zethmayr et al, "Charge for Less: An Analysis of Hourly Electricity Pricing for Electric Vehicles", Citizens Utility Board USA, World Electric Vehicle Journal, vol. 10, No. 6, Jan. 17, 2019, 9 pages.

* cited by examiner

POWER TO THE BOX SYSTEMS AND METHODS

TECHNICAL FIELD

The present disclosure relates to power to the box (PttB) systems and methods that allow a user to control and track usage of PttB systems in vehicles.

BACKGROUND

Adoption of electrified vehicles is currently expanding to include larger platforms including trucks. This move has driven the development of the Power-to-the-Box (PttB) features within vehicles which will allow the driver to supply electricity to a worksite, campsite, tailgate, and so forth, through outlets or ports installed in the truck bed. One of the most demanding applications relate to onsite contractors who utilize power for commercial purposes.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
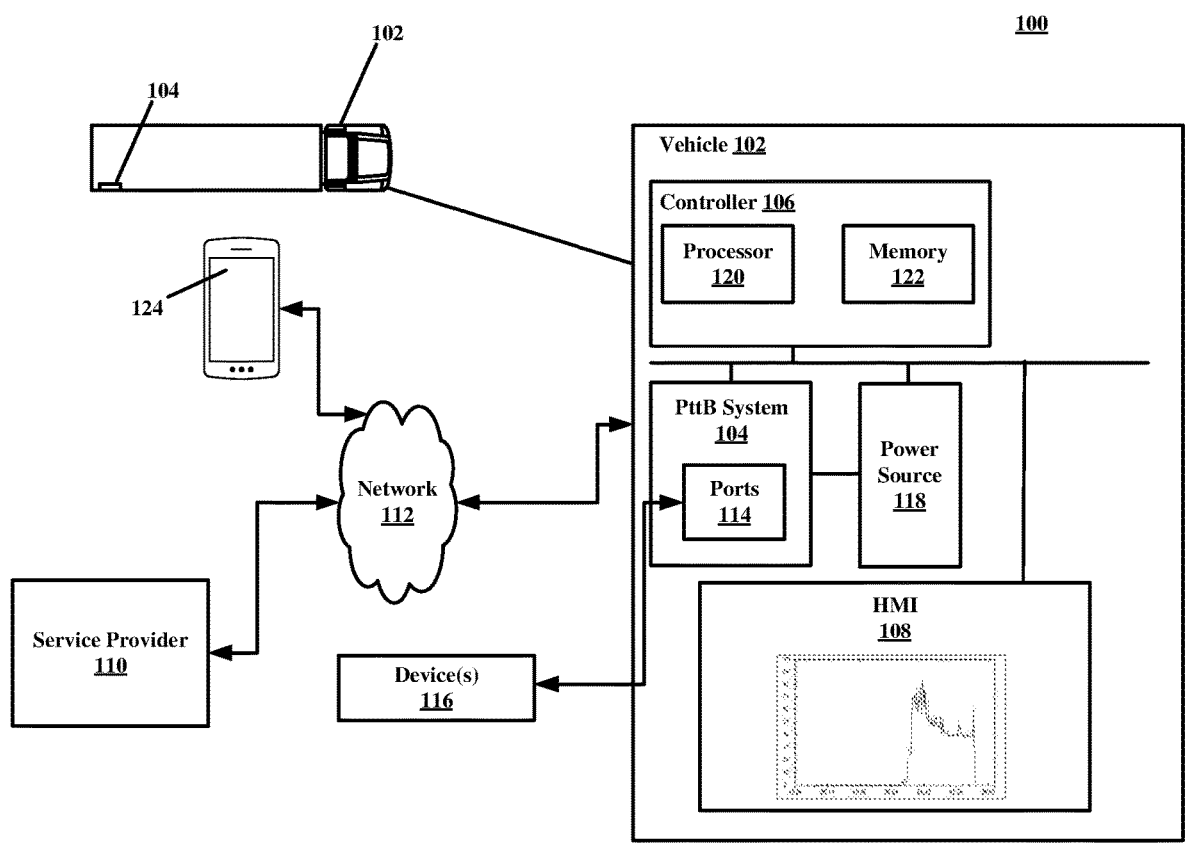
FIG. 1 depicts an illustrative architecture in which techniques and structures for providing the systems and methods disclosed herein may be implemented.

The systems and methods disclosed herein are configured to allow a user of a PttB system to track and control usage of the PttB system of a vehicle. The PttB system power usage events may be tracked, analyzed, recorded, and invoiced. The power usage events can be measured and converted to a cost value using an energy cost factor. According to some embodiments, the power usage events can be logged and converted into a line item for an invoice. In this manner, a user can create invoices using the systems and methods disclosed herein that include PttB usage, as well as other job costing items such as a bill of materials.

According to some embodiments, the systems and methods herein can provide automated PttB control features, where PttB usage can be controlled based on usage limitations. For example, a PttB system can be automatically shut off when power usage exceeds an allowable limit.

The systems and methods herein allow a PttB user to measure, record, and invoice energy that was consumed from the PttB system by an external device. By way of example, upon arrival at a job site, a driver of a vehicle configured with a PttB system disclosed herein can activate their PttB system and press a button or other recording feature to "start job". In other embodiments, tracking can be based on activation of the PttB system (e.g., power draw therefrom) without requiring a user to activate the recording feature. The recording feature can be actuated through a graphical user interface (GUI) provided on a human machine interface (HMI) of the vehicle, such as an infotainment system.

A controller of the vehicle can create a new job file to which it will record the time, date, location, and other relevant info for the job at hand. It can also begin measuring and recording energy that may be used from the PttB system. During work, the driver may use a drill, table saw, planer, or other tools which consume energy from the PttB system. A controller of the vehicle can record the power drawn in order to determine the total energy consumed for a given job or other period of use.

At the end of the job, the driver can select to "end job". At this point the controller of the vehicle may generate an invoice including the total kWh kilowatt-hour of energy that were consumed during the job by multiplying the kWh of energy used by some energy cost factor in terms of $/Wh. This cost factor could be detected and recorded while the vehicle is charging based on a smart grid signal or entered directly by the driver. This could also include a cost factor based on fuel consumed during operation of the PttB system (e.g., measuring fuel levels before and after the PttB usage).

The driver could then add this cost to the itemized project invoice that they provide to their customers or an employer and allow the driver to accurately account to the energy costs incurred during the project.

By way of non-limiting example, a contractor is contracted with a project for a customer. During this job, the contractor uses $50 in wood and $10 in nails. The power usage of their PttB system is tracked. At the end of the project the contractor ends the PttB job and is told that they used $5 in energy based on having used 20 kWh from the PttB system at a cost of $0.20/kWh. This $5 may be added to the final total cost of the project along with materials and labor. A controller of the vehicle can complete the file initiated at the outset of the job. This not only ensures that the customer is provided with a clear and fair assessment of the projects costs but also ensures that the contractor is able to recoup the cost of the energy that they used and had previously paid for when they charged their vehicle.

In the case of larger projects which may require multiple days to completer, rather than ending a given project file at the end of the day, the driver may pause a project at the end of the day and resume it the next day when they are back working on the project. Multiple files could be stored on the vehicle in case the user is working on several projects at different locations over a period of time. In this way the total energy costs for a given project may be accurately invoiced even over a prolonged period of days or weeks.

ILLUSTRATIVE EMBODIMENTS

Turning now to the drawings, FIG. 1 depicts an illustrative architecture 100 in which techniques and structures of the present disclosure may be implemented. The illustrative architecture 100 may include a vehicle 102, a PttB system 104, a controller 106, a human machine interface (HMI) 108, a service provider 110, and a network 112.

The network 112 may include any one or a combination of multiple different types of networks, such as cable networks, the Internet, wireless networks, and other private and/or public networks. In some instances, the network 112 may include cellular, Wi-Fi, or Wi-Fi direct.

In general, the vehicle 102 can include a truck that comprises the PttB system 104, although other vehicle types can also include a Pttb system. In some embodiments, the PttB system 104 includes one or more ports 114. These ports 114 can vary in configuration but may include universal serial bus (USB) ports, 110 Volt ports, 220 Volt ports, or any other port configuration that is desired by the user. One or more devices 116 that require electrical energy can be connected to the ports 114 of the PttB system 104. To be sure, the PttB system 104 can deliver electrical energy from a power source 118 of the vehicle 102. The power source 118 could include a battery that is dedicated to the PttB system 104, or a battery that is used generally by other components of the vehicle 102.

The PttB system 104 can be coupled with the controller 106. In general, the controller 106 can be configured to track usage of the PttB system 104, as well as provide other PttB system functionalities such as automatic PttB system control, as will be discussed in greater detail herein.

In some embodiments, the controller 106 may comprise a processor 120 and memory 122. The memory 122 stores instructions that are executed by the processor 120 to perform aspects of the PttB system tracking and/or control as disclosed throughout. When referring to operations executed by the controller 106 it will be understood that this includes the execution of instructions by the processor 120.

The controller 106 can include any controller within the vehicle 102. For example, the controller 106 can be the same controller that is used to control functionalities of the HMI 108. The controller 106 could be a dedicated controller integrated into the PttB system 104. In another embodiment, the controller 106 could include a controller positioned in any part of the vehicle 102. In yet another embodiment, the controller 106 could comprise a mobile device of a user, such as mobile device 124. Generally, the mobile device 124 could install and execute an application that receives PttB data from the controller 106 (or service provider 110 in some embodiments). The tracking, analysis, and invoicing features disclosed herein could occur on the mobile device 124. To be sure, PttB system functionalities disclosed herein related to tracking, invoicing, and control of a PttB system can be performed entirely at the vehicle level, entirely at the service provider level, at the mobile device level, or cooperatively between any of these components.

In some embodiments, power usage of the PttB system 104 can be tracked and reported based on the controller 106 receiving a signal that is indicative of power being output by the PttB system 104. For example, when a user plugs a device into the PttB system 104 and draws power, the controller 106 can sense this power draw through the PttB system 104 and begin tracking power usage. As noted above, the sensing of use of the PttB system 104 could result in the creation of a new file, such as a log file, for the storage of the usage parameters of the PttB system 104. Rather than using a file, the usage parameters of the PttB system 104 can be transmitted directly to the mobile device 124 and/or the service provider 110.

In general, usage parameters of the PttB system 104 can include power draw/consumption/usage/output as determined over a period of use. The period of use could include individual power draw events or multiple power events extending over a time frame from when the PttB system 104 is first activated until a terminating event. The terminating event could include the user deactivating a recording feature provided through the HMI 108, as will be discussed in greater detail herein. The period of use could also include tracking PttB system 104 usage from a point in time when a recording feature is activated, such as a button push until deactivation of the recording feature at a second point in time when the same (or a different) button is pushed.

Generally, the controller 106 can track and store usage parameters of the PttB system 104 in the memory 122. The usage parameters could include power output by the PttB system 104 in terms of raw power data, average, aggregate, and so forth. In some embodiments, the controller 106 can identify location information of the vehicle 102. The location information can include, for example, global positioning system (GPS) data obtained from a connected vehicle system such as a navigation system (not shown). These location data can be included in the PttB system data (e.g., usage parameters) that are tracked by the controller 106. Thus, the controller 106 can be configured to identify location information of the vehicle 102 and include the location information in the message. In one embodiment the location information can be added to an invoice.

In some embodiments, the PttB system data tracked/recorded by the controller 106 can be provided as a message that can be displayed through the HMI 108. The message could be provided to the mobile device 124 in some instances. An example message can include a calculation of a power consumption/usage as noted above. For example, measurements of power usage of the PttB system 104 can be captured kWh. The kWh can be converted into a monetary value in some embodiments. In other embodiments, the message can include the raw power usage data. In various embodiments, the message can include monetary value of the raw power usage data, or both. The message can include data which are displayed on the HMI 108. In other embodiments, the message can include an invoice that is automatically populated with the monetary value of the raw power usage data, or both. Some embodiments include providing an invoice template through the HMI 108 to allow the user of the vehicle 102 to track jobsite matters. The jobsite matters can include both the monetary value of the usage parameters of the PttB system 104, as well as line items for other billable items such as hours, building materials, and so forth. In general, the message can comprise an invoice that comprises invoiced amounts for the usage parameters.

The invoiced amounts can correspond to monetary conversions of the usage parameters into monetary values. As noted above, the controller 106 can convert the usage parameters of the PttB system 104 into a monetary value by obtaining an energy cost factor and applying the energy cost factor to the usage parameters. The energy cost factor could be obtained by the controller 106 based on a most recent charging event. For example, the vehicle 102 was recently recharged at a cost of $1.50 per kWh. In another embodiment, if the vehicle 102 uses an internal combustion engine to charge the batteries used by the PttB system 104, the controller 106 can calculate the monetary value based on fuel consumption and current fuel costs. In situations where the vehicle 102 uses hybrid power, the controller 106 can calculate a monetary value from aggregations of both electric power usage and fuel consumption.

According to some embodiments, once invoices are created, these invoices can be transmitted to the service provider 110 for retention. In various instances, the service provider 110 can include a business or employer of the user of the vehicle 102. Also, while the invoicing features disclosed herein have been discussed as being performed at the vehicle level, the invoicing can also alternatively be created at the service provider 110.

In various embodiments, the controller 106 can cause the provision of an invoice template through a HMI 108 of the vehicle, receive invoiced items using the invoice template, and populate the invoice with the invoiced items and the invoiced amounts.

According to some embodiments, the PttB system 104 usage parameters can be used to automate control of the PttB system 104. In various embodiments, controller 164 can apply power constraint parameters to regulate the PttB system 104. In one embodiment, the power constraint parameters could include a threshold or limit on an aggregate amount of power that can be output by the PttB system 104 over a period of time or per location. For example, a user can limit a total power output of the PttB system 104 to prevent excess or overuse of the PttB system 104. In one example, an employer may limit a total power output of the PttB system 104 within an eight hour period to prevent a user of the vehicle 102 from unapproved or excess usage. The employer may desire to reduce the likelihood that the user of the vehicle would use the PttB system 104 to power devices such as radios or televisions. These costs would inadvertently be passed to their customer through an invoice as disclosed herein as an overcharge of the power usage. Thus, it is desirable to limit the total power output of the PttB system 104 in some instances. This limit can be referred to as power constraint parameters. In various embodiments, the total power output of the PttB system 104 could be based on a pre-determined agreement between the employer and the customer. The total power output of the PttB system 104 could be limited based on historical usage parameters of the PttB system 104 determined over time. When the power output of the PttB system 104 meets or exceeds this limit, the controller 106 can automatically deactivate the PttB system 104 when the applied power constraint parameters have been exceeded. The controller 106 can also allow for reactivation of the PttB system 104 when an override command is received. For example, the controller 106 may be programmed to receive an override command that allows the user to override after a deactivation event. In one example, the user can obtain the override command, such as a sequence of digits from their employer. The sequence of digits can be generated by the controller 106 upon request from the employer (through an administrator functionality), or through use of the service provider 110. For example, the employer can activate an override command process at the service provider 110. The service provider 110 can generate the override command and transmit the same to the controller 106 and the mobile device 124 of the user. The user can enter the override command into the HMI 108 and reactivate the PttB system 104. In other embodiments, the override command can be transmitted to the controller 106, and the controller 106 can automatically reactivate the PttB system 104 in response.

Figure 2:
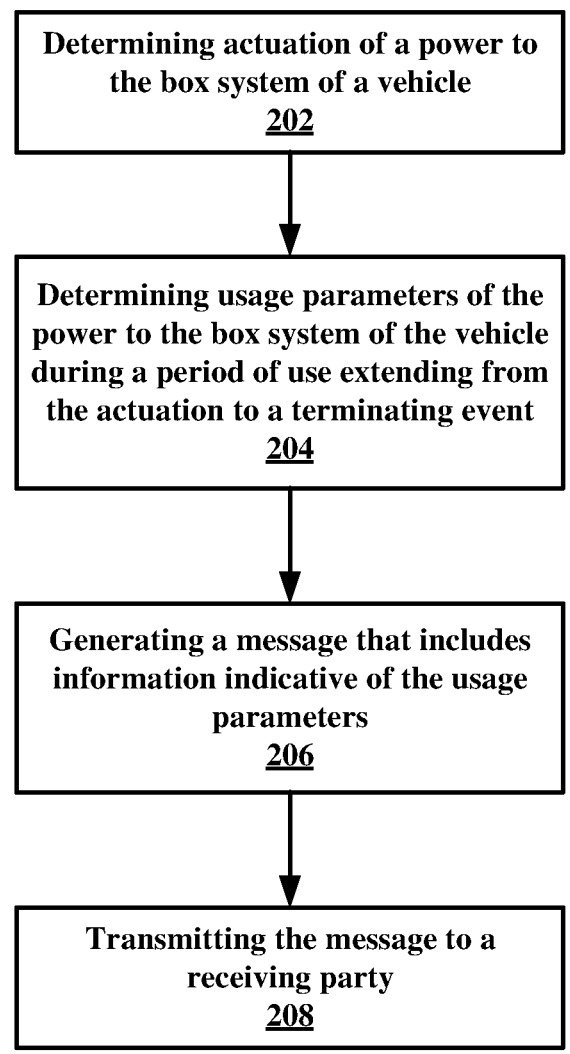
FIG. 2 is a flowchart of an example method of the present disclosure.

FIG. 2 is a flowchart of an example method of the present disclosure. The method includes a step 202 of determining actuation of a power to the box system of a vehicle. This could include sensing that power is being output from the PttB system. In another embodiment, this could include determining a first selection of a recording feature that activates recording of the usage parameters of the power to the box system. The activation of the recording feature could include selection of a physical or virtual button on the vehicle HMI. For example a GUI provided on the HMI could include a virtual button labeled as "Start Recording".

Next, the method can include a step 204 of determining usage parameters of the power to the box system of the vehicle during a period of use extending from the actuation to a terminating event. The period of use can have any duration. The terminating event could include an expiration of period of use or a specific termination using a second selection of the recording feature noted above. The termination of the recording feature could include selection of a physical or virtual button on the vehicle HMI. For example a GUI provided on the HMI could include a virtual button labeled as "Stop Recording".

Next, the method can include a step 206 of generating a message that includes information indicative of the usage parameters. The message could include a graphical display of usage parameters in a raw data or a graphical form. Next, the method can include a step 208 of transmitting the message to a receiving party. For example, the message could include a GUI or an invoice. The transmission could thus include the display of the GUI on an HMI of the vehicle, or transmission of an invoice to a service provider. In various embodiments, the usage parameters could also be stored locally at the vehicle 102 for future analysis.

Figure 3:
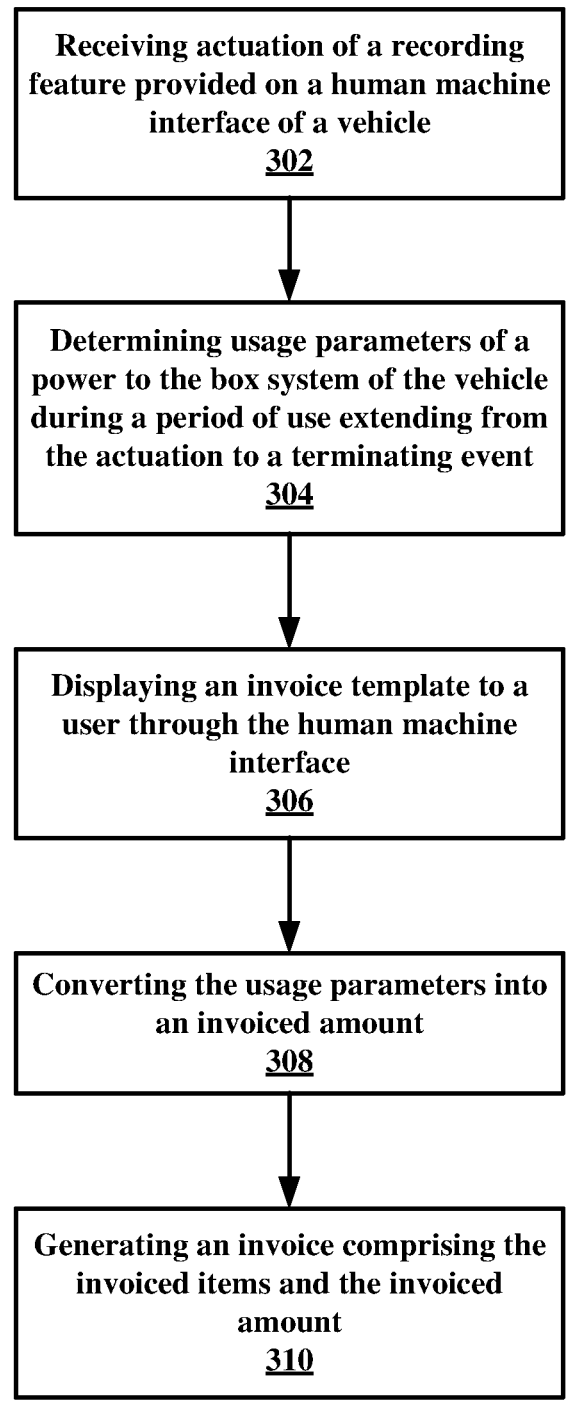
FIG. 3 is a flowchart of another example method of the present disclosure.

FIG. 3 is a flowchart of another example method of the present disclosure. The method can include a step 302 of receiving actuation of a recording feature provided on a human machine interface of a vehicle. Again, as an example, this could include a user activating a button provided on an HMI of the vehicle. Alternatively, a physical or virtual switch or button could be provided on the PttB system. In one example, the PttB system is positioned in a truck bed of a truck. The user can activate the recording feature using a mechanism provided on the PttB system in the truck bed of the truck.

Next, the method includes a step 304 of determining usage parameters of a power to the box system of the vehicle during a period of use extending from the actuation to a terminating event. In various embodiments, the method includes a step 306 of displaying an invoice template to a user through the human machine interface. In various embodiments, the method includes a step 306 of receiving invoiced items from the invoice template, as well as a step 308 of converting the usage parameters into an invoiced amount. The method can also include a step 310 of generating an invoice comprising the invoiced items and the invoiced amount.

Figure 4:
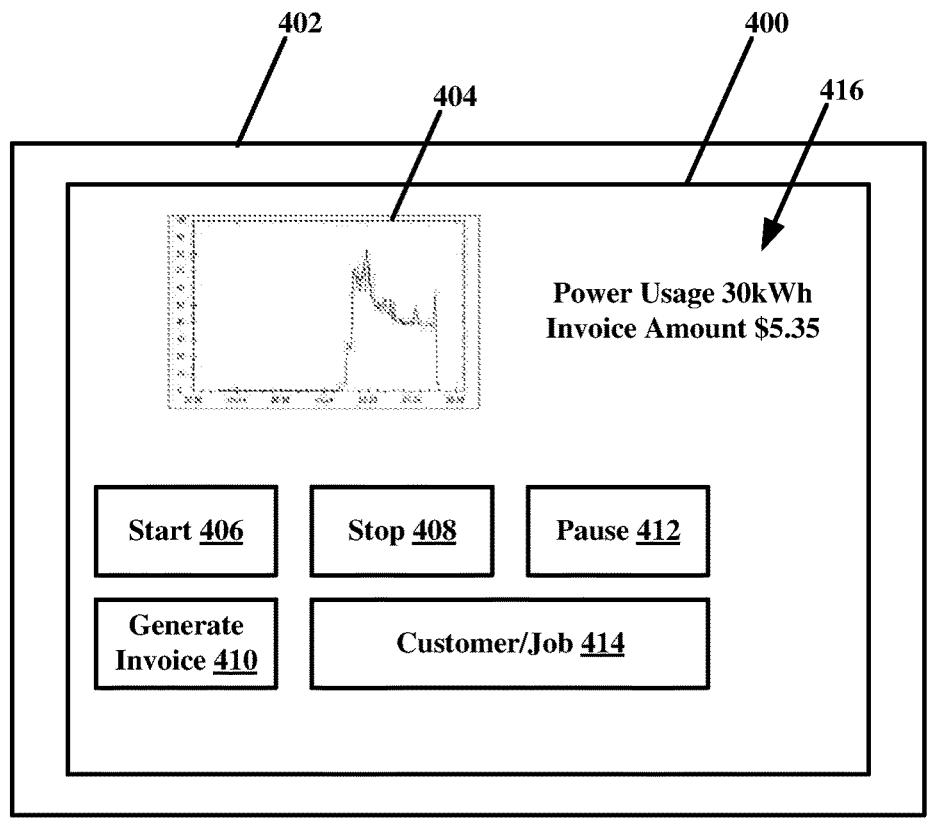
FIG. 4 illustrates an example graphical user interface (GUI) that can be utilized in accordance with embodiments of the present disclosure.

FIG. 4 illustrates an example graphical user interface (GUI 400) displayed on a HMI 402 of a vehicle. The GUI 400 includes a graph 404 of usage parameters for a PttB system. The graph 404 plots power output of the PttB system over time. Again, the beginning and ending portions of the graph can correspond to activation and deactivation of a recording feature as disclosed herein. For example, the GUI 400 can include a first selection in the form of a button 406, as well as a second selection in the form of a button 408. In some embodiments, a single button can be used. The GUI 400 could also include a "Generate Invoice" button 410 that causes the creation of an invoice from collected usage parameters. In various embodiments, the GUI 400 could include a "Pause" button 412 that allows a user to pause usage parameter collection. As noted above, this feature allows a user to collect usage parameters over a number of days. The GUI 400 could also include a "Select Customer or Job" button 414 which allows the user to select which customer/job is to be linked to collected usage parameters. When button 414 is selected, a selectable list of customers or jobs could be displayed. When selected, a customer/job can be associated with collected usage parameters. The usage parameter data 416 can be displayed proximately or adjacent to the graph 404.

Figure 5:
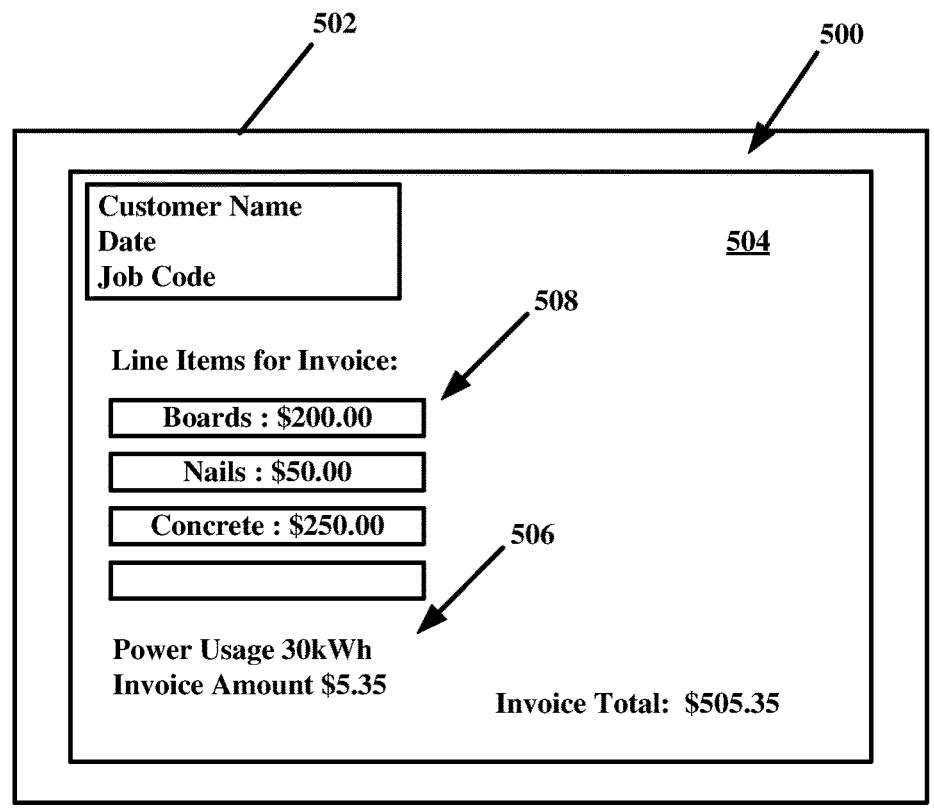
FIG. 5 illustrates an example graphical user interface (GUI) that can be utilized in accordance with embodiments of the present disclosure to provide invoice templating.

FIG. 5 illustrates an example graphical user interface (GUI 500) displayed on a HMI 502 of a vehicle. The GUI 500 could include an invoice template 504. The invoice template could include a pre-populated field 506 that includes an invoiced amount for usage parameters. The invoice template can also have additional fields 508 that receive invoiced items. For example, the user can enter a material cost into one of the additional fields 508. For example, the user can utilize a virtual keyboard or voice control made available through the HMI input invoice items. The controller can then populate the invoice template 504 with the input. If the user approves of the invoice, the assembled invoice can be transmitted to a customer, an employer, and/or a service provider. The invoice can also be stored locally for future use. Customer data can be added in a field located anywhere on the invoice template 504.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that stores computer-executable instructions is computer storage media (devices). Computer-readable media that carries computer-executable instructions is transmission media. Thus, by way of example, and not limitation, implementations of the present disclosure can comprise at least two distinctly different kinds of computer-readable media: computer storage media (devices) and transmission media.

Computer storage media (devices) includes RAM, ROM, EEPROM, CD-ROM, solid state drives (SSDs) (e.g., based on RAM), flash memory, phase-change memory (PCM), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method, comprising:
   determining, by a processor coupled to a memory, actuation of a power to the box system of a vehicle;
   determining, by the processor, usage parameters of the power to the box system of the vehicle during a period of use extending from the actuation to a terminating event;
   generating, by the processor, a message that includes information indicative of the usage parameters; and
   transmitting, by the processor, the message to a receiving party,
   wherein the message comprises an invoice that comprises invoiced amounts for the usage parameters, wherein the invoice amounts are determined by multiplying a power usage by an energy cost factor, and wherein the energy cost factor is determined during charging of the vehicle.

2. The method according to claim 1, further comprising identifying, by the processor, location information of the vehicle and including the location information in the message.

3. The method according to claim 1, further comprising determining, by the processor, a first selection of a recording feature that activates recording of the usage parameters during the period and a second selection of the recording feature to terminate recording of the usage parameters.

4. The method according to claim 1, wherein the usage parameters comprise at least power usage.

5. The method according to claim 1, further comprising:
   providing, by the processor, an invoice template through a human machine interface of the vehicle;
   receiving, by the processor, invoiced items using the invoice template; and
   populating, by the processor, the invoice with the invoiced items and the invoiced amounts.

6. The method according to claim 1, further comprising applying, by the processor, power constraint parameters to regulate the power to the box system.

7. The method according to claim 6, further comprising automatically deactivating, by the processor, the power to the box system when the power constraint parameters have been exceeded.

8. The method according to claim 7, further comprising receiving, by the processor, an override command that reactivates the power to the box system after the automatic deactivation of the power to the box system.

9. A system, comprising:
   a human machine interface of a vehicle;
   a power to the box system of the vehicle; and
   a controller comprising a processor and a memory, the processor executing instructions stored in the memory to:
   determine actuation of the power to the box system of a vehicle;
   determine usage parameters of the power to the box system of the vehicle during a period of use extending from the actuation to a terminating event;
   generate a message that includes information indicative of the usage parameters; and
   transmit the message to a receiving party,
   wherein the message comprises an invoice that comprises invoiced amounts for the usage parameters, wherein the invoice amounts are determined by multiplying a power usage by an energy cost factor, and wherein the energy cost factor is determined during charging of the vehicle.

10. The system according to claim 9, wherein the processor is configured to identify location information of the vehicle and include the location information in the message.

11. The system according to claim 10, wherein the processor is configured to determine a first selection of a recording feature that activates recording of the usage parameters during the period and a second selection of the recording feature to terminate recording of the usage parameters.

12. The system according to claim 9, wherein the processor is configured to:
   provide an invoice template through a human machine interface of the vehicle;
   receive invoiced items using the invoice template; and
   populate the invoice with the invoiced items and the invoiced amounts.

13. The system according to claim 9, wherein the processor is configured to:
   apply power constraint parameters to regulate the power to the box system;

automatically deactivate the power to the box system when the applied power constraint parameters have been exceeded; and receive an override command to reactivate the power to the box system after the automatic deactivation of the power to the box system.

\* \* \* \* \*